United States Patent [19]

Crapo

[11] Patent Number: 5,629,846

[45] Date of Patent: May 13, 1997

[54] METHOD AND SYSTEM FOR DOCUMENT TRANSLATION AND EXTRACTION

[75] Inventor: Andrew W. Crapo, Scotia, N.Y.

[73] Assignee: General Electric Company, Schenectady, N.Y.

[21] Appl. No.: 313,961

[22] Filed: Sep. 28, 1994

[51] Int. Cl.$^6$ .................................................. G06F 17/22
[52] U.S. Cl. .............................................. 395/785; 395/774
[58] Field of Search ........................ 364/419.1; 395/600, 395/145, 146, 148, 500

[56] References Cited

U.S. PATENT DOCUMENTS

| | | | |
|---|---|---|---|
| 4,559,614 | 12/1985 | Peek et al. | 364/900 |
| 4,730,270 | 3/1988 | Okajima et al. | 364/900 |
| 4,881,197 | 11/1989 | Fischer | 364/900 |
| 4,896,289 | 1/1990 | Svinicki et al. | 364/927.92 |
| 5,208,905 | 5/1993 | Takakura et al. | 395/148 |
| 5,438,657 | 8/1995 | Nakatani | 395/148 |

*Primary Examiner*—Gail O. Hayes
*Assistant Examiner*—Frantzy Poinvil
*Attorney, Agent, or Firm*—David C. Goldman; Marvin Snyder

[57] ABSTRACT

A method and system for translating an electronic document from one format to an electronic document in a second format. Selected portions from a source document are extracted and transformed into the format of a target document. A translation rule set is then deduced from the extracted portions and the transformed portions. The translation rule set is then applied to the source document, producing a first draft. If the translation rule set is unable to translate a portion from the source document, then the user is notified of the untranslatable portion. The user then provides examples of how the untranslatable portion should be translated into the format of the target document. The translation rule set is then modified in accordance with the examples. Next, the modified translation rule set is applied to the source document, producing a second draft. The above steps are repeated until the source document has been completely translated into the format of the target document or until the user is satisfied with the translation.

24 Claims, 3 Drawing Sheets

1

METHOD AND SYSTEM FOR DOCUMENT TRANSLATION AND EXTRACTION

BACKGROUND OF THE INVENTION

The present invention relates generally to electronic textual documents, and more particularly to translating an electronic textual document having a first format into an electronic target document having a second format.

Electronic textual documents exist in many different formats ranging from plain ASCII text to proprietary editor viewer formats. In recent years there has been greater interest and importance attached to storing documents in formats which are public or which may be translated into public formats. One particular class of public formats is known as Standard Generalized Markup Language (SGML), which is a standard-based tagging methodology that provides a platform and application independent document while allowing information such as formatting, indexing, and linked information to remain within the document. SGML is accomplished by embedding SGML-compliant codes known as tags to build the document into its final formatted form. These standard-based tagging methodologies are gaining in use, especially in the publishing industry. However, there exists a vast amount of electronic material and paper documents available for scanning and use of optical character recognition which are in non-standard formats that cannot be readily translated into SGML compliant formats.

Since the value of a document is dependent upon its accessibility, there is further value added when the document can be displayed in a different environment using different viewers which sometimes require different formats. Thus, there is a need to be able to translate documents from one format or tagging scheme to another. Currently, there are several types of document viewing/editing software available that provide internal or external translators that can go from their own format to an industry standard and formats of others. Essentially, these translators are written in low-level languages such as C or C++, or by using LEX and YACC to construct parsers. LEX is a tool for building lexical analyzers which identify the next token in the character stream being processed. YACC is a tool for creating rule-based parsers which receive the stream of tokens from the lexical analyzer and identify the pattern and ensure legal syntax. Once such a parser has been written to understand a particular format, code may then be written to output the information in the target format. Coding these translators is labor intensive and requires a great deal of time. Therefore, there is a need for an easy to use approach that translates documents without requiring a lot of time and specialized skill to write the translation code.

In addition to the translation problem described above, there often exists a need to restructure a document. If the document is in an SGML-compatible format, restructuring may be done by simply editing the DTD (document type definition). However, if the document is not in a standard format, it may be very difficult to restructure the document. Thus, if there was an easy to use translator, then this problem would be able to be overcome by approaching the restructuring as a translation problem.

SUMMARY OF THE INVENTION

Therefore, it is a primary objective of the present invention to provide a method and system for translating documents from one format into another format which does not require a lot of time and skill to use.

Another object of the present invention is to provide a method and system that can quickly restructure an original source document into a target document by using selected examples.

In the present invention, a user selects a few portions from a source document which is to be translated. The selected portions contain various constructs and formats. The selected portions are then transformed manually by an editor into the format of a target document. In the present invention, the text does not change, only the tagging or control information is modified. Translation rules are then deduced from the transformed selected portions and their corresponding originals. The translation rules are used for mapping the entire source document to the target document. If the translator is confronted with constructs or formats that are not covered by the translation rules, then the user can supply additional examples to extend the amount of translation rules. The present invention is simple and does not require the time or skill necessary to write code as in the above-mentioned translators.

Thus, in accordance with the present invention, there is provided a method for translating an electronic source document having a first format into an electronic target document having a second format. The method comprises selecting portions of constructs and formats from the source document. Then the selected portions are extracted from the source document. The format of the extracted portions are transformed into the second format of the electronic target document. From the original and transformed portions, a set of translation rules are deduced. The translation rule set is applied to the electronic source document and used to translate the source document into the target document. As the translation rule set is applied to the electronic source document, a first draft is produced.

Also, in accordance with the present invention, there is provided a system for translating an electronic source document having a first format into an electronic target document having a second format. The system comprises a selecting means for selecting portions from the source document having various constructs and formats. An extraction means extracts selected portions from the source document. A transforming means transforms the format of the extracted portions into the second format of the electronic target document. The transformation can be greatly facilitated by importing the text into a WYSIWYG (What you see is what you get) editor for the target format, but the present invention does not assume any particular process for preparing the selected portions of the document. A deducing means deduces a translation rule set from the original and transformed portions. A first applying means applies the translation rule set to the electronic source document. A first producing means produces a first draft of the electronic target document as the translation rule set is applied to the electronic source document.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
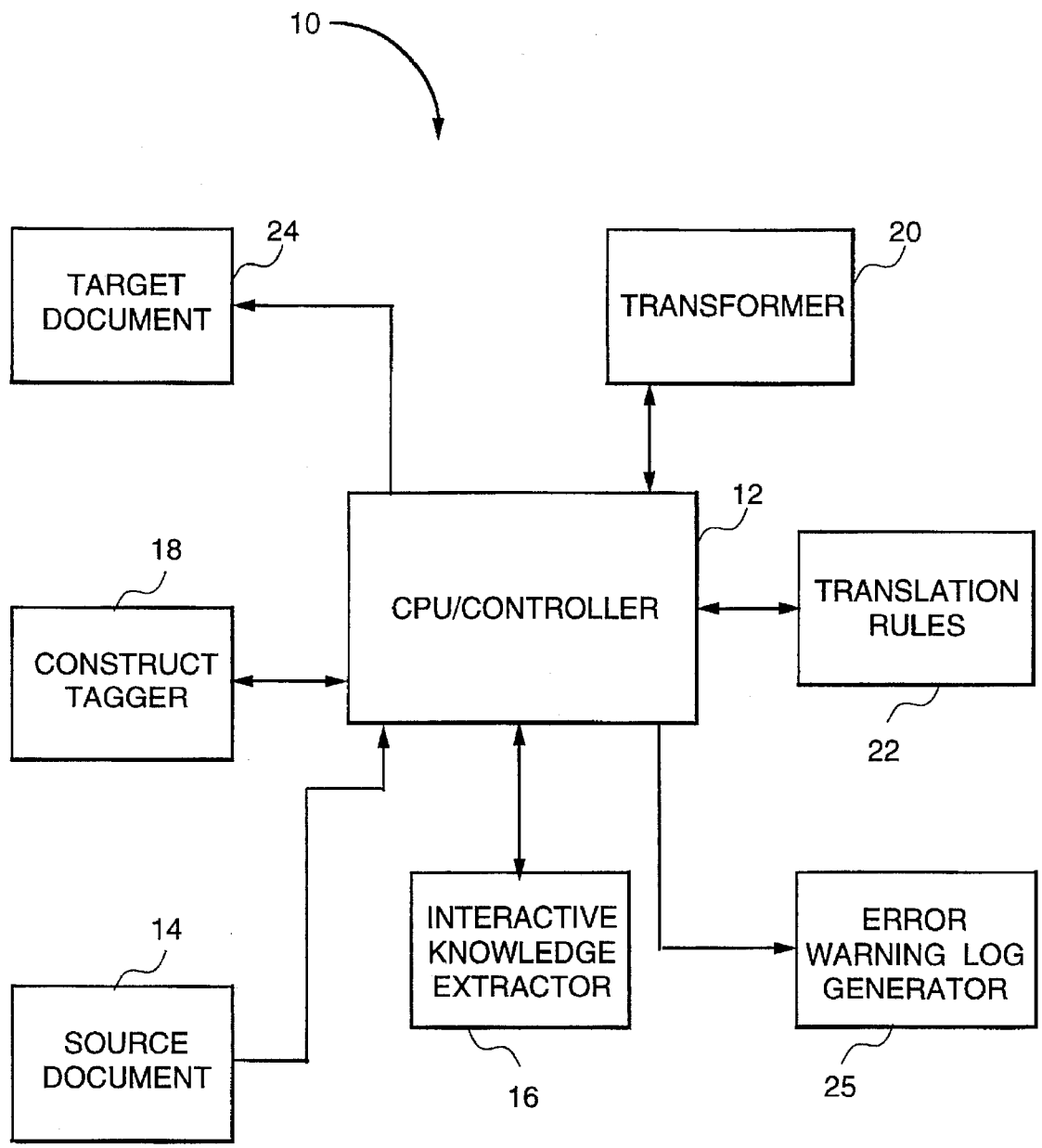
FIG. 1 is a block diagram of a system according to the present invention.

FIG. 1 shows a block diagram of a system 10 according to the present invention. The system includes a CPU/controller 12 which may, for example, be a general purpose computer such as a personal computer, a workstation, or a micro- or minicomputer. The computer receives an electronic source document 14 which may be a computer file or other type of electronically stored document with all of the original tagging/formatting information still in tact. The input document may also be the result of scanning a source document from hard copy (i.e., paper) and using optical character recognition and other techniques to capture, with the text, as much formatting information as possible. The electronic source document 14 may be generated from a commercially available word processing package such as Microsoft Word™, Framemaker™, WordPerfect™, or the like.

An interactive knowledge extractor 16 such as a mouse and keyboard, selects various portions from the source document and extracts the selected portions therefrom. The extracted portions are then transformed into the format of a target document 24 by a transformer 20 such as an editor. The various constructs and formats (tags) from the selected portions are then identified by a construct tagger 18. In order to deduce a translation rule set, the CPU/Controller needs the tags from the extracted portions and the new tags from the target portions. The text then serves as a basis or reference to allow deduction of what are tags in both the old and new representations. Once both types of tags are identified by the construct tagger, translation rules may be postulated. The CPU/Controller 12 then deduces the translation rule set that is used to translate the source document into the target document. The translation rule set is stored in a translation rule base 22. After the translation rule set has been deduced, it is then applied by the CPU/Controller to the electronic source document 14. As the translation rule set is applied, the text and format in the source document are translated into the format of the target document (i.e., another, commercially available word processing package) resulting in a first draft. An error/warning log generator 25 identifies portions of text in the source document that were unable to be translated by the translation rule set. The translation rule set is then modified into a new translation rule set by selecting additional examples or portions from the source document and applying the technique described above. Then the new translation rule set is applied to the electronic source document. These steps continue until the source document has been completely translated into the target document or until the user is satisfied with the translation.

Figure 2:
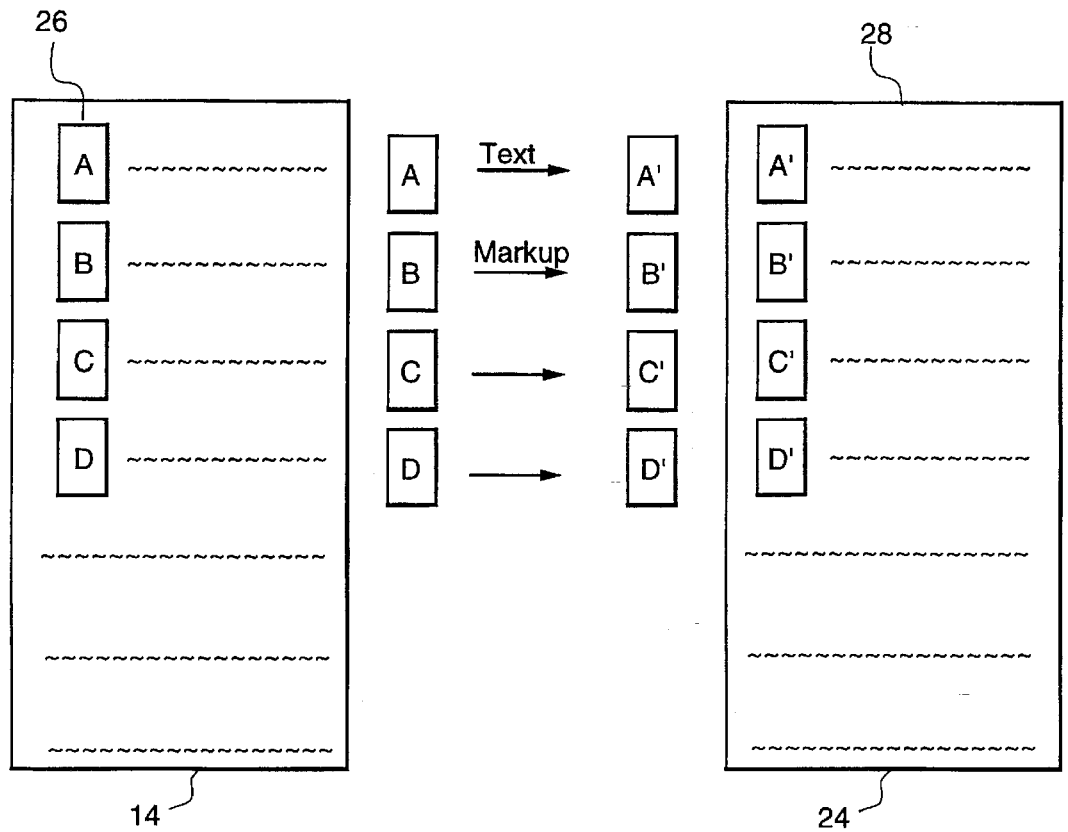
FIG. 2 is a schematic illustrating the translation of a source document into the format of the target document.

FIG. 2 is a schematic illustrating the translation of the source document 14 into the format and constructs of the target document 24. Within the source document 14 are portions of text 26 labeled A, B, C, D, etc., having various constructs and formats. Note that the portions could be pages of text or classes of documents and is not limited to paragraphs as shown in FIG. 2. The interactive knowledge extractor 16 selects various portions (e.g., A, B, C, D) from the source document and extracts the selected portions therefrom. The text and the original tagging in the selected portions are extracted. The extracted portions are then transformed into the format of the target document 24 by the transformer 20. The construct tagger 18 identifies the tags extracted from the source document and the new tags formed from the transformation. In FIG. 2, portion A is extracted and transformed into the format of the target document and shown as portion A'. Similar extractions and transformations are made on the portions B, C, and D, resulting in corresponding portions B', C', and D', respectively.

Figure 3:
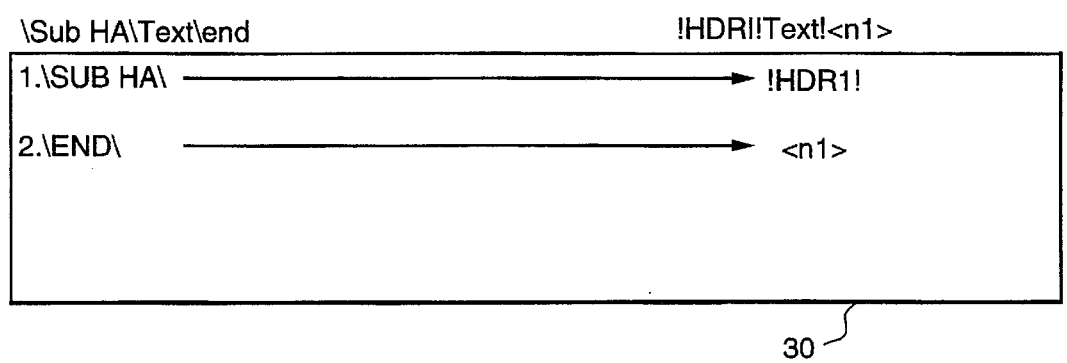
FIG. 3 is an example of a translation rule set.

After transforming several portions 26, the translation rule set is then deduced from these portions and the transformed portions 28. The translation rule set is deduced by using the principles of case-base reasoning. In particular, the translation rule set is deduced by examining the portions of text (i.e., A, B, C, D, etc.) and the corresponding transformed portions (i.e., A', B', C', D', etc.). By examining enough cases (i.e., original selected portions and corresponding transformed portions), rules can be correlated on how to translate the source document 14 into the format of the target document 24. An example of a translation rule set 30 for portions A, B, C, and D is shown in FIG. 3. In FIG. 3, a portion containing the following information \SubHA\Text\end, translates into !HDR1!Text<n1>. Thus, rules can be deduced to indicate that the format \SubHA\ in the source document will translate into the format !HDR1! in the target document and the format \end\ will translate into the format <n1>. Other rules can be derived from other portions and placed in the translation rule set. After the translation rule set has been deduced, it is applied to the electronic source document 14. The example in FIG. 3 is an illustration of how the translation rules are deduced. Although the example is relatively simple in scope, it is within the realm of the present invention to cover much more complicated cases. As the translation rule set 30 is applied, the text and format in the source document are translated into the format of the target document, resulting in a draft.

An added feature of the present invention, is the error/warning log generator 25 which identifies portions of the source document that were unable to be translated by the translation rule set. This feature depends upon the translator having a model of the source tagging scheme allowing it to identify characters which are likely to be tags in the source document, but for which it has no translation rules. However, this model need not be difficult. In the example provided in FIG. 3, the model might be that characters between two back slashes are tags. In the present invention, the error/warning log generator 25 has the capacity to provide assumptions of problems in the translation rule set that are preventing the translation of a certain portion of the source document. Alternatively, the error/warning log generator can notify the user of missing portions or rules from the translation rule set 30 or of conflicting examples which require additional information to allow discrimination and avoid conflicting rules. Upon receiving the error/warning log, the user interactively enters portions of text and format from the source document using the editor to transform the portions of the source document into the corresponding format of the target document. After enough portions of the source document have been selected, extracted, and transformed, the CPU/Controller 12 modifies the translation rule set into a new translation rule set. After the new translation rule set has been formulated, it is then applied to the electronic source document. As the new translation rule set is applied, the text and format in the source document are again translated into the format of the target document, resulting in a second draft.

If the second draft is not a complete translation of the source document, then the error/warning log generator notifies the user of other portions of text that were identified as being untranslatable. The user then selects more examples from the source document and the editor transforms them into the format of the target document. After enough portions of the source document have been selected, extracted, and transformed, the translation rule set is modified into another translation rule set. After the newest translation rule set has been formulated, it is then applied to the electronic source document. As the new translation rule set is applied, the text and format in the source document are again translated into the format of the target document, resulting in a third draft. The above steps continue until the source document has been completely translated into the target document or until the user is satisfied with the translation.

Figure 4:
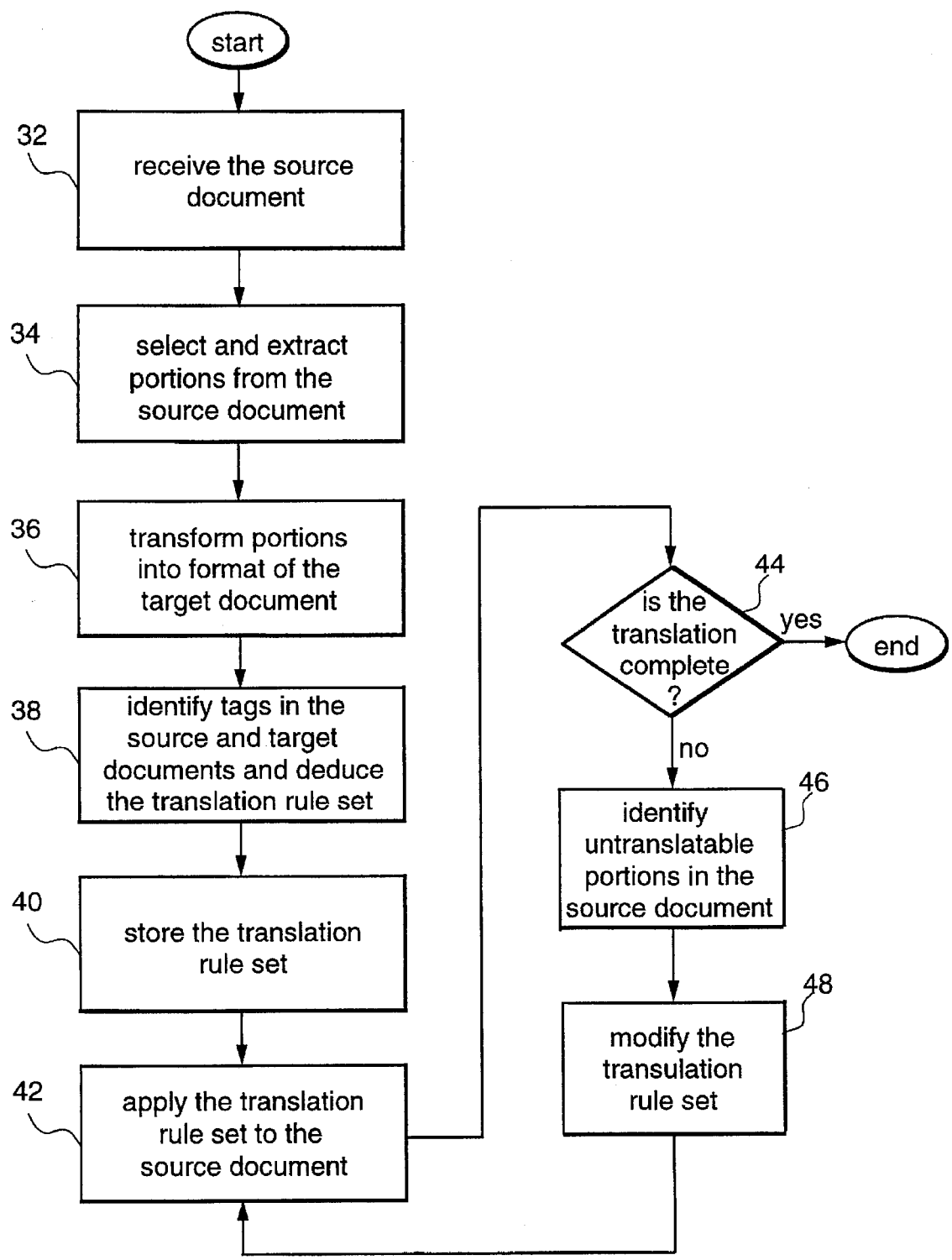
FIG. 4 is a flow chart describing the operation of the present invention.

FIG. 4 is a flow chart describing the operation of the present invention. At 32, the computer receives the electronic source document 14. The interactive knowledge extractor selects various portions from the source document and extracts the selected portions at 34. The extracted portions are then transformed into the format of the target document at 36. The various constructs and formats from the source document and the transformed portions from the target document are identified at 38. In addition, the translation rule set is then deduced at 38. The translation rule set is then stored at 40. The translation rule set is then applied to the electronic source document at 42. If the translation is not complete at 44, then portions of the source document that were unable to be translated by the translation rule set are identified at 46. The translation rule set is then modified into a new translation rule set at 48. After the new translation rule set has been formulated, it is then applied again to the electronic source document at 42. The above steps continue until the source document has been completely translated into the target document or until the user is satisfied with the translation.

It is therefore apparent that there has been provided in accordance with the present invention, a method and system for translating a source document into the format of a target document that fully satisfy the aims, advantages and objectives hereinbefore set forth. The invention has been described with reference to several embodiments, however, it will be appreciated that variations and modifications can be effected by a person of ordinary skill in the art without departing from the scope of the invention.

I claim:

1. A method for translating an electronic source document having a first format into an electronic target document having a second format, the method comprising the steps of:
    selecting portions from the source document having various constructs and formats;
    extracting the selected portions from the source document;
    transforming the format of the extracted portions into the second format of the electronic target document;
    deducing a translation rule set from the extracted portions and the transformed portions;
    applying the translation rule set to the electronic source document;
    producing a first draft of the electronic target document as the translation rule set is applied to the electronic source document; and
    identifying portions from the electronic source document which were unable to be translated into the target document.

2. The method according to claim 1, further comprising modifying the translation rule set to account for the identified untranslatable portions.

3. The method according to claim 2, wherein the step of modifying includes interactively entering example sets of various portions and segments in the second format that correspond to the identified untranslatable portions.

4. The method according to claim 3, wherein the step of modifying comprises generating a new rule set containing rules for translating the identified untranslatable portions.

5. The method according to claim 4, further comprising applying the new rule set to the electronic source document.

6. The method according to claim 5, further comprising producing a second draft of the electronic target document as the new translation rule set is applied to the electronic source document.

7. The method according to claim 6, further comprising repeating the steps of identifying, modifying, generating, applying, and producing, until the electronic source document has been translated into the format of the electronic target document.

8. The method according to claim 1, wherein the step of transforming is performed by using an editor.

9. The method according to claim 1, wherein the step of identifying comprises providing an error log identifying the portions of the electronic source document that were untranslatable.

10. A method for translating an electronic source document having a first format into an electronic target document having a second format, the method comprising the steps of:
    selecting portions from the source document having various constructs and formats;
    extracting the selected portions from the source document;
    transforming the format of the extracted portions into the second format of the electronic target document;
    deducing a translation rule set from the extracted portions and the transformed portions;
    applying the translation rule set to the electronic source document;
    producing a first draft of the electronic target document as the translation rule set is applied to the electronic source document;
    identifying portions from the electronic source document which were unable to be translated into the electronic target document;
    modifying the translation rule set to account for the identified untranslatable portions, the modified translation rule set being a new rule set;
    applying the new rule set to the electronic source document; and
    repeating the steps of producing, identifying, modifying, and applying, until the target document is in a desired format.

11. The method according to claim 10, wherein the step of identifying comprises providing an error log identifying the portions of the electronic source document that were untranslatable.

12. The method according to claim 10, wherein the step of modifying includes interactively entering example sets of various portions and segments in the second format that correspond to the identified untranslatable portions.

13. A system for translating an electronic source document having a first format into an electronic target document having a second format, the system comprising:
    means for selecting portions from the source document having various constructs and formats;
    means for extracting the selected portions from the source document;

means for transforming the format of the extracted portions into the second format of the electronic target document;

means for deducing a translation rule set from the extracted portions and the transformed portions;

first means for applying the translation rule set to the electronic source document;

first means for producing a first draft of the electronic target document as the translation rule set is applied to the electronic source document; and first means for identifying portions from the electronic source document which were unable to be translated into the target document.

14. The system according to claim 13, further comprising means for modifying the translation rule set to account for the identified untranslatable portions.

15. The system according to claim 14, wherein the modifying means includes means for interactively entering example sets of various portions and segments in the second format that correspond to the identified untranslatable portions.

16. The system according to claim 13, wherein the transforming means is an editor.

17. The system according to claim 14, wherein the modifying means comprises means for generating a new rule set containing rules for translating the identified untranslatable portions.

18. The system according to claim 17, further comprising second means for applying the new rule set to the electronic source document.

19. The system according to claim 18, further comprising second means for producing a second draft of the electronic target document as the new translation rule set is applied to the electronic source document.

20. The system according to claim 19, further comprising second means for identifying more portions from the electronic source document which were unable to be translated in the target document.

21. The system according to claim 19, wherein the first and second identifying means provides an error log identifying the portions of the electronic source document that were untranslatable.

22. A system for translating an electronic source document having a first format into an electronic target document having a second format, the system comprising:

means for selecting portions from the source document having various constructs and formats;

means for extracting the selected portions from the source document;

means for transforming the format of the extracted portions into the second format of the electronic target document;

means for deducing a translation rule set from the transformed portions;

first means for applying the translation rule set to the electronic source document;

means for producing a first draft of the electronic target document as the translation rule set is applied to the electronic source document;

means for identifying portions from the electronic source document which were unable to be translated into the electronic target document;

means for modifying the translation rule set to account for the identified untranslatable portions, the modified translation rule set being a new rule set;

second means for applying the new rule set to the electronic source document; and means for repeating the steps of producing, identifying, modifying, and applying, until the target document is in a desired format.

23. The system according to claim 22, wherein the identifying means provides an error log identifying the portions of the electronic source document that were untranslatable.

24. The system according to claim 22, wherein the modifying means includes interactively entering example sets of various portions and segments in the second format that correspond to the identified untranslatable portions.

* * * * *